United States Patent

Bauchot et al.

[11] Patent Number: 5,912,918
[45] Date of Patent: Jun. 15, 1999

[54] METHOD AND AN APPARATUS FOR ATTACHMENT OF A REMOTE STATION TO A BASE STATION IN A MULTICELLULAR COMMUNICATIONS NETWORK

[75] Inventors: Frederic Bauchot, Saint-Jeannet; Alain Dorel, Villeneuve-Loubet; Frederic Lefevre; Arnaud Lund, both of Cagnes-Sur-Mer; Luc Revardel, La Gaude, all of France

[73] Assignee: International Business Machines Corporation, Armonk, N.Y.

[21] Appl. No.: 08/728,223

[22] Filed: Oct. 10, 1996

[51] Int. Cl.$^6$ .................................................. H04B 15/00
[52] U.S. Cl. .................... 375/202; 375/356; 370/85.3; 370/85.2
[58] Field of Search ..................... 375/202, 356, 375/200; 370/350, 337, 280, 281, 329, 330, 522; 455/502, 524, 450, 63, 62, 76

[56] References Cited

U.S. PATENT DOCUMENTS

| | | | |
|---|---|---|---|
| 5,442,659 | 8/1995 | Bauchot et al. | 375/202 |
| 5,519,706 | 5/1996 | Bantz et al. | 370/85.3 |
| 5,533,025 | 7/1996 | Fleek et al. | 370/85.2 |
| 5,590,410 | 12/1996 | Deutsch et al. | 455/76 |

FOREIGN PATENT DOCUMENTS

| | | |
|---|---|---|
| 0658023 | 8/1993 | European Pat. Off. . |
| 0650274 | 9/1994 | European Pat. Off. . |

*Primary Examiner*—Stephen Chin
*Assistant Examiner*—Shuwang Liu
*Attorney, Agent, or Firm*—John D. Flynn; Winstead, Sechrest & Minnick, PC

[57] ABSTRACT

In a multicellular communications network system comprising base stations and a plurality of remote stations, a remote station listens for frames of information emitted by the different base or remote stations, in order to insert the network. The base stations and the remote stations comprise means for emitting the frames of information using a sequence of changing frequency hops of different operating frequencies. The remote station determines a set of "n" operating frequencies (Fi), from which it sequentially listens for a fixed period of time equal to 1/n of the frequency hopping period (FH) of a base station. When a frame of information is received by the remote station during one of the fixed period, the information is collected and processed in order to select the base station for attachment.

16 Claims, 6 Drawing Sheets

METHOD AND AN APPARATUS FOR ATTACHMENT OF A REMOTE STATION TO A BASE STATION IN A MULTICELLULAR COMMUNICATIONS NETWORK

TECHNICAL FIELD

The present invention relates to communication systems, and more particularly to synchronization of frequency hopping communication systems.

BACKGROUND ART

Frequency hopping is a radio communication technique in spread-spectrum modulation wherein information is transmitted using a sequence of carrier (or operating) frequencies that change at set times to produce a narrow band signal that bounces or hops around a center frequency over an available frequency spectrum.

In a centrally controlled multicellular mobile radio communication system based on slow frequency hopping, each cell has a base station that provides the necessary timing and control information received and used by all the remote stations that belong to the cell.

All stations belonging to a cell, the base station and all remote stations that belong to it, must hop in synchronism in order to communicate with each other at the same frequency. Different cells will typically operate on different frequency hopping patterns. The control information required for synchronized frequency hopping is broadcast by the base station. A key problem in the operation of a frequency-hopping based system is that of acquiring hop synchronization between one remote station and the base of a cell.

The following references are typical of the background art in the field of frequency hopping systems and synchronization techniques thereof.

U.S. Pat. No. 5,081,641 issued Jan. 14, 1992 to Kotzin et al. entitled "Interconnecting And Processing System For Facilitating Frequency Hopping" discloses a method and apparatus for facilitating communication of information in a system without the use of a baseband hopping unit, by sharing a common TDM bus between a plurality of radio communication units, processing units, and information links, where the processing units extract traffic channel information, packetize and/or unpacketize the information, and return same back to the common bus for retrieval by the information links or radio communication units.

In U.S. Pat. No. 4,850,036 issued Jul. 18, 1989 to Smith entitled "Radio Communication System Using Synchronous Frequency Hopping Transmissions" a frequency-hopping radio communication system is disclosed comprising a control unit which transmits to and receives from each of a plurality of slave stations using a frequency-hopping mode of operation. During a start-up mode, the control unit communicates a starting message to each slave station using a predefined frequency. The message identifies to each slave station a frequency-hopping sequence to be used to select the frequencies from a group of frequencies for transmission to and reception from the control unit. This message also specifies to each slave station unique starting frequencies in the frequency-hopping sequence at which to begin transmitting and receiving. All slave station transmission are synchronized to the control unit transmissions, thereby preventing any two stations from concurrently using the same frequencies for either transmitting to or receiving from the control unit.

EP 0658 023 A1 from IBM discloses a method for selecting a base station in a multicellular communication network system of the type having base stations and a plurality of remote stations. When a remote is first powered up it chooses randomly a frequency and searches for valid header messages from neighboring bases. After a fixed period of time which is equal to the length of a superframe (MAC protocol exchanges during the complete base station frequency hopping pattern) it randomly switches to another frequency and keeps on monitoring.

While the solutions of the prior art are efficient in their environment, they do not directly address the problem of shortening the procedure of radio environment listening. Moreover, the use of a signaling channel does not comply with the U.S. Federal Communications Commission (FCC) regulation in the 2.4 GHz Band, while the average and the maximum duration for selecting a base in the prior art does not comply with the fast base selection required for the actual hand-off systems.

SUMMARY OF THE INVENTION

It is an object of the present invention to provide a method and structure for achieving reliable and fast base selection in a radio communication cell.

It is a further object of the present invention to allow a remote station to select a base with an acceptable average and maximum duration, enabling the possibility to have hand-off between cells.

It is another object of the present invention to provide a method that allows a remote station to scan rapidly a set of "n" frequencies upon the duration of a base station hop.

It is yet another object of the present invention to tailor the rapidity of the scanning to the minimum information density sent or received by a base station.

Accordingly, in the preferred embodiment of the invention, a method for attachment of a remote station to a base station in a multicellular communications network system is provided. The network comprises base stations and a plurality of remote stations, wherein the base stations and the remote stations comprise means for emitting frames of information using a sequence of changing frequency hops of different operating frequencies. The method for the attachment of a remote station comprises the steps of: determining a set of "n" operating frequencies (Fi), on each said frequency (Fi) sequentially listening for frames of information emitted by said different base or remote stations, said listening being for a fixed period of time equal to $1/n$ of the frequency hopping period (FH) of a base station, collecting and processing the information contained in a frame when a frame of information is received by one of said remote stations during one of the fixed period, and selecting a base station for attachment.

DETAILED DESCRIPTION OF THE INVENTION

Figure 1:
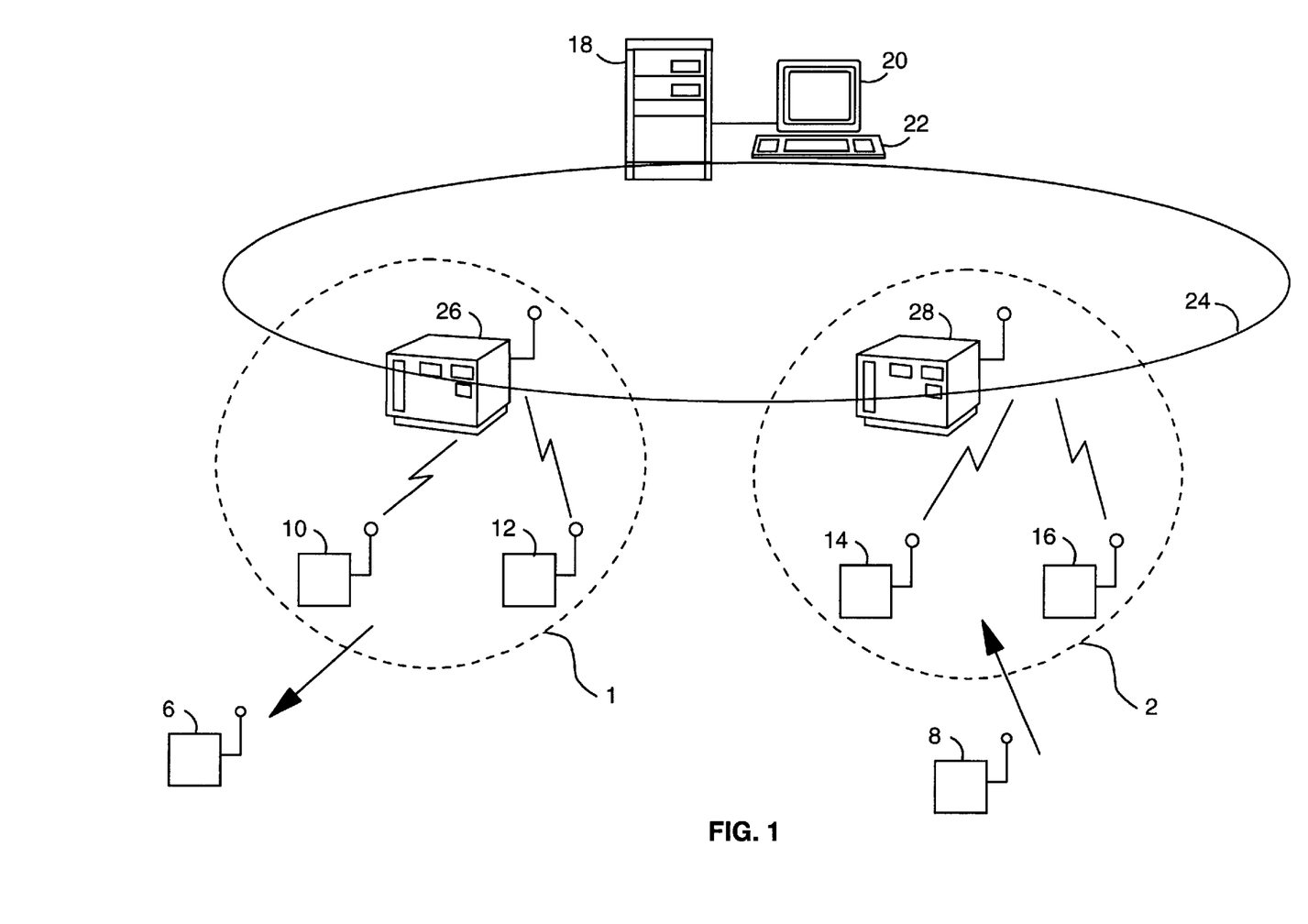
FIG. 1 shows a pictorial diagram showing a typical radio digital data communication system of the type in which the invention is implemented.

Referring now to the drawings, and more particularly to FIG. 1, there is shown a typical radio system allowing communication between a plurality of mobile stations 10, 12, 14, and 16 and applications and data residing in a computing system. The computing system typically includes a Wireless Network Manager (WNM) or Wireless Network Controller 18, with attached monitor 20 and keyboard 22, of a local area network (LAN), generally indicated by reference numeral 24, having a plurality of attached workstations or personal computers (not shown for simplicity). Also attached to the LAN are one or more gateways 26 and 28 with which the mobile stations 10, 12, 14, and 16 communicate. These gateways, referred to as base stations, are augmented according to the invention to provide certain radio system management functions which coordinate the mobile stations' access to the common radio channel. Communications between mobile stations is supported via relay through the base stations 26 and 28.

Figure 1A:
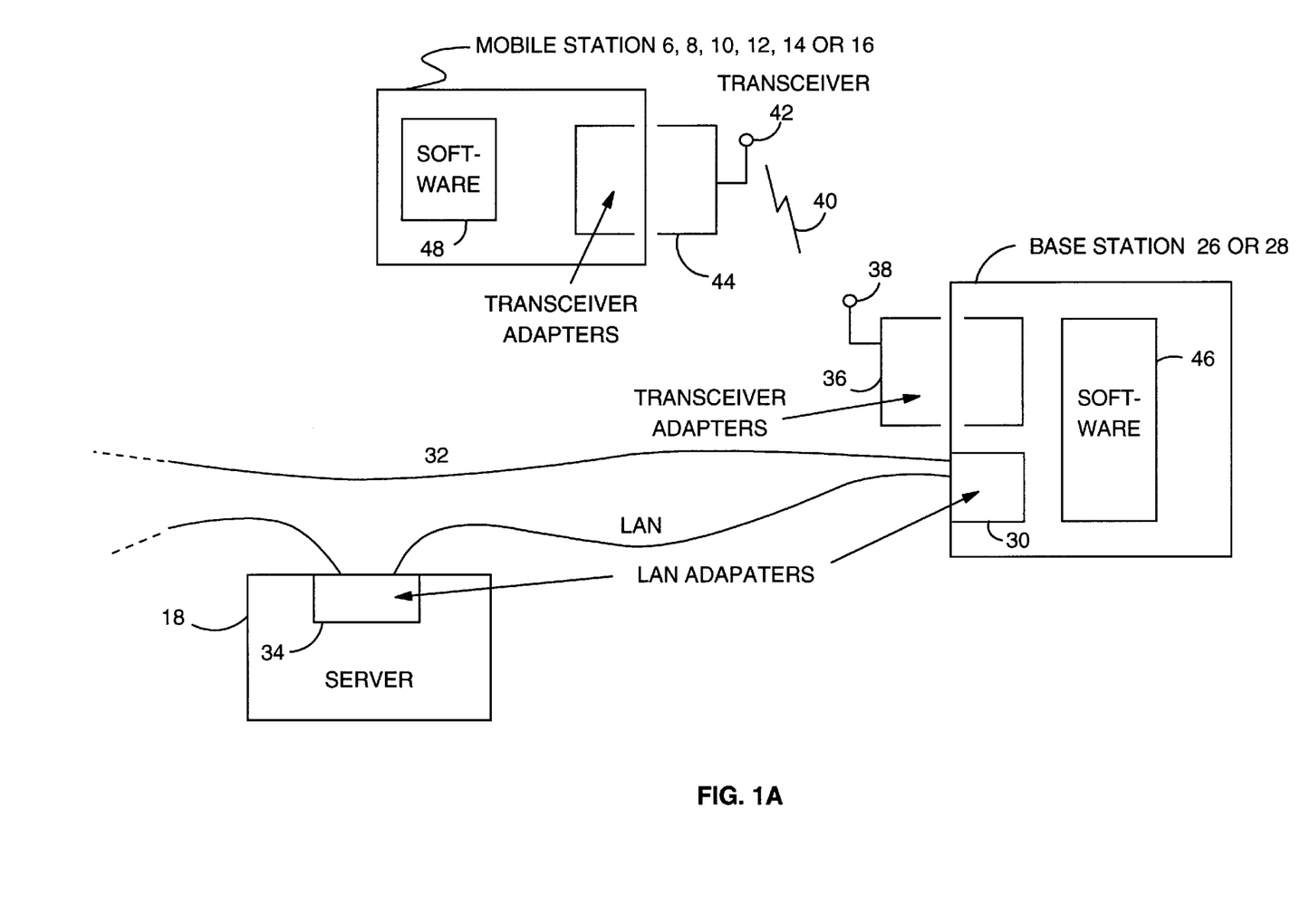
FIG. 1A shows a block diagram of the system shown in FIG. 1 illustrating the basic components of a mobile station and a base station as known in the art.

As shown in more detail in FIG. 1A, a base station 26 or 28, which may be a conventional microcomputer, has a LAN adapter 30 inserted in a bus slot and connected to LAN cabling 32. The WNM 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and LAN cabling 32 together with LAN software constitute the LAN 24. The LAN 24 is of conventional design. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations, 10, 12, 14, or 16. The mobile station may itself be a hand held or lap top computer of conventional design and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adapters.

Figure 2:
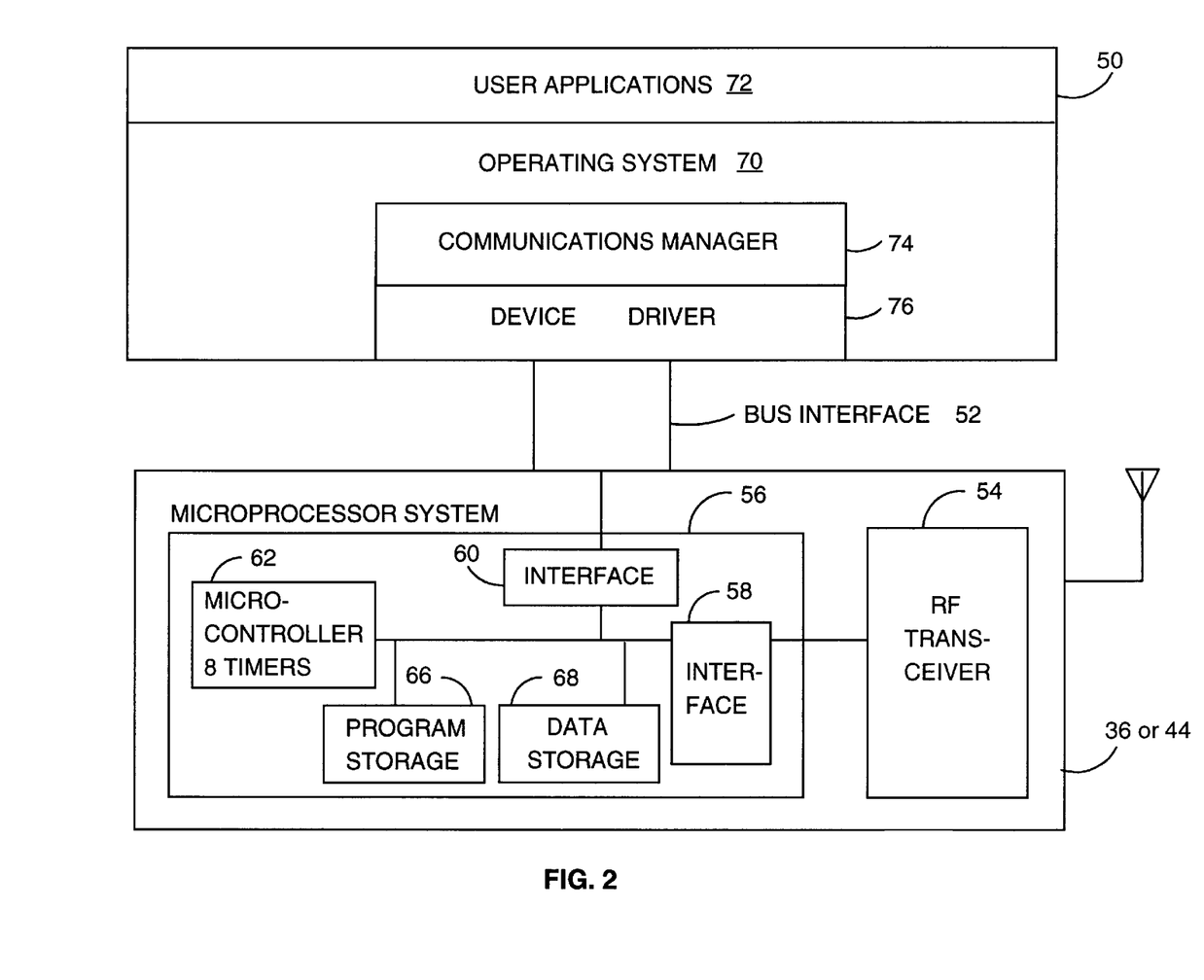
FIG. 2 shows a block diagram of the radio system used in the implementation of a preferred embodiment of the invention.

FIG. 2 shows the radio system common to both the mobile stations and the base stations of FIG. 1. The radio system includes a transceiver adapter 36 or 44 connected to the computer 50 via the computers bus interface 52. The transceiver station is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems.

Microprocessor 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for example Mischa Schwartz, Telecommunication Networks: Protocols, Modeling and Analysis, Addison-Wesley (1988).

When a packet is received through the RF transceiver 54, the serial channels check the packet destination address, check for errors, and deserialize the packet to data storage 68. The serial channels must have the capability to recognize a specific adapter address as well as a broadcast address. Specific microprocessors with appropriate serial channel and timer facilities include the Motorola 68302 and the National HPC46400E microprocessors.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

Figure 3:
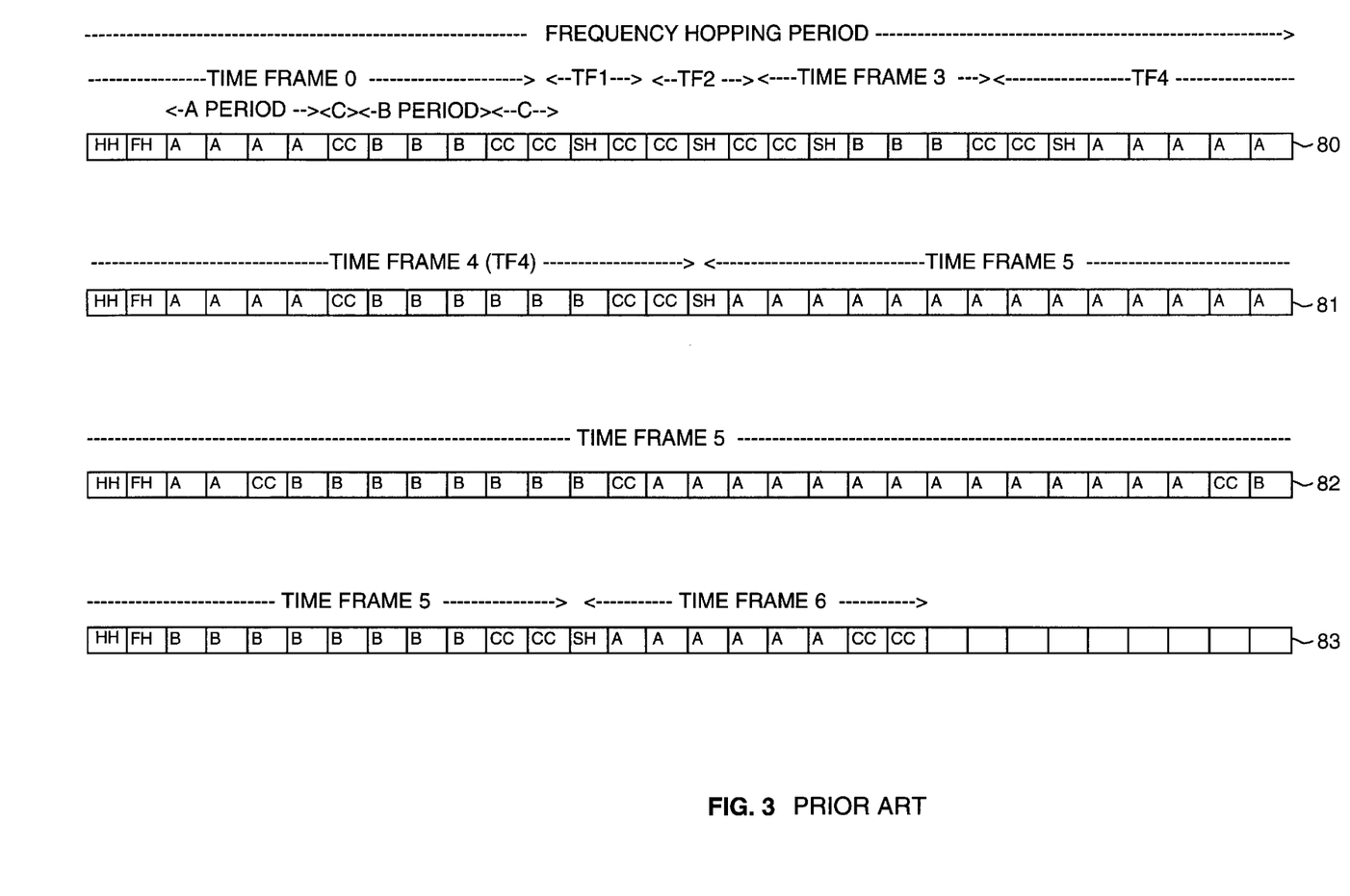
FIG. 3 is a diagram of the frame structure of the MAC protocol of the prior art.
Figure 4:
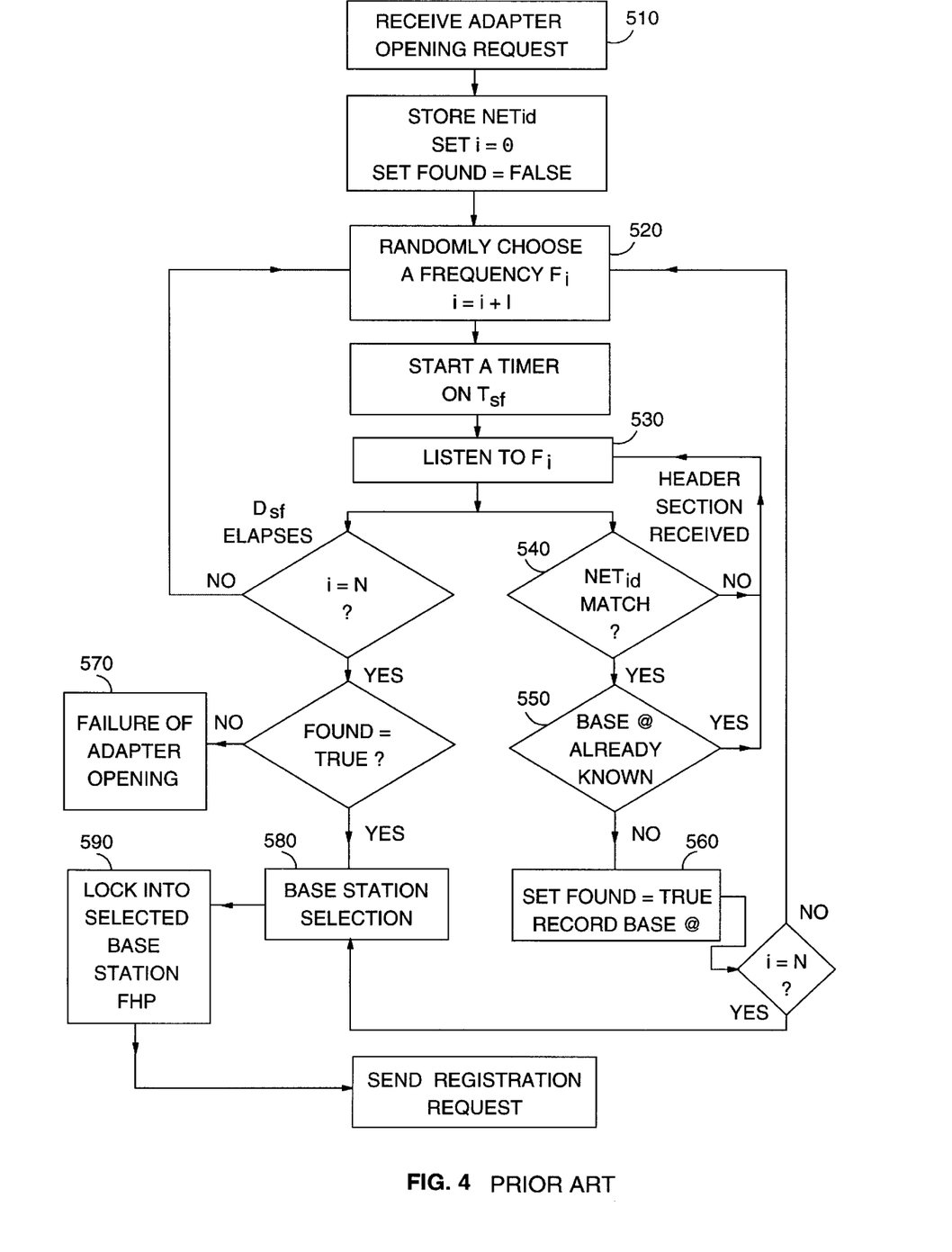
FIG. 4 is an illustration of a flow chart of steps employed in the monitoring and selection phases of the synchronization technique of the prior art.

Referring now to FIG. 3, a variable length time frame structure which consists of interleaved A, B and C type time slots along with frame and frequency hopping headers is described. The structure and length of the frame is traffic dependent, all frames start with a header packet SH which describes the structure of the frame, followed by interleaved sequences of contiguous type A, type B or type C time slots, each sequence of contiguous time slots of the same type being designated as a period. During A time slots the radio link is used exclusively for outbound data transfer from the base station to remote stations and acknowledgments in the reverse direction. Both control and data outbound traffic occurs within A slots. During B slots the radio link is used exclusively for reservation-based inbound data transfer from the remote stations to the base station and acknowledgments in the reverse direction. Only inbound data traffic occurs within B slots. In a preferred embodiment of the invention, during C slots the radio link is used for contention based inbound data transfer from remote stations to the base station and acknowledgments in the reverse direction. However the person skilled in the art can easily devise other arrangements in which type C slots are used for direct communication between remote stations without using the base station as a relay. Both control and data traffic may occur within C slots. A and B time slots have the same duration which is equal to twice the duration of a C slot. In a preferred embodiment of the invention type C time slots are always grouped by pairs and will be referred to as C pairs. Slot allocation is performed by a scheduler resident in the base station adapter 26 or 28 in FIG. 1A. Time slots are allocated in each time frame for inbound and outbound transfers according to instantaneous traffic conditions, the time frame duration is variable as can be seen from the examples of time frames shown in FIG. 3 (time frame 0 to time frame 6). Each line in FIG. 3 (80, 81, 82, 83) represents a frequency hop time period. Hop header (HH) is sent before switching from the current frequency to the next one in the hopping pattern. It is used by registering remote stations to select a base station. Frequency header (FH) is sent after the frequency has been switched. It is used for synchronization between the base station and remote stations and for hopping pattern tracking, it also provides traffic information for power saving purposes. Slot header (SH) is sent at the beginning of each time frame, it carries traffic information representative of the structure of the time frame describing the sequence of interleaved type A, type B and type C periods to come. Each period being defined by its type A, B or C, the number of slots and the destination and source address of the slots. In a particular embodiment of the invention source and destination addresses can be used for type C slots allocated for direct transmission between two remote stations without using the base station as a relay.

Referring now to the first frequency hop 80 in FIG. 3, it shows the last portion of time frame 0 which consists in 4 type A slots for outbound traffic followed by 1 type C pair for contention-based inbound data and control traffic, 3 type B slots for reservation based inbound data traffic and again 2 type C pairs. It is assumed that the SH header corresponding to time frame 0 was sent during the previous frequency hop not represented in this figure. Time frame 1 (TF1) follows, it starts with a SH header, followed by two type C pairs. This time frame type represents the longest possible inactivity period during which no traffic occurs. The structure of time frame 2 is identical to time frame 1. Time frames 1 and 2 are illustrative of the traffic sent by an idle base station. Time frame 3 comprises 3 type B slots dedicated to reservation based inbound traffic followed by two type C pairs. This is the kind of traffic experienced when there is no outbound message from the base station to the remote stations. Time frame 4 spills over a frequency hop boundary represented by the HH/FH headers sequence at the beginning of the second frequency hop 81 in FIG. 3. Time frame 4 consists in a SH header followed by 9 type A slots, 1 type C pair, 6 type B slots and 2 type C pairs. The HH/FH headers sequence is inserted after the 5 first type A slots of time frame 4 to reserve time for frequency hopping. Time frame 5 spills over two frequency hop boundaries represented by the HH/FH headers sequences at the beginning of the third and fourth frequency hops 82 and 83, it comprises 16 type A slots, followed by one type C pair, 8 type B slots, 1 type C pair, 14 type A slots, 1 type C pair, 9 type B slots and 2 type C pairs. Both time frame 4 and 5 are representative of a fairly to highly loaded traffic. They show how a time frame may extend over two or more frequency hops. In addition time frame 5 shows how different types of slots can be interleaved in the same time frame. It should be noted that the HH and FH headers are transmitted on a cyclic basis corresponding to the fixed frequency hopping period THOP, whereas the SH headers are sent at a pace depending on traffic conditions.

This protocol assures that the maximum inactivity duration is five slots long, and that a listening remote station is sure to get any kind of packet from a station within six slots, if the remote station listens on the same frequency.

In the preferred embodiment of the invention the duration of the various headers, slots and hops is as follows:

HH and FH headers: 2 milliseconds (ms)
SH header: 4 ms
A and B slots: 4 ms
C slots: 2 ms
FH period: 96 ms For the clarity of the description, the different parameters used to achieve the invention are: Thop is the duration of the FH period, N is the number of frequencies in the hopping pattern of the base station (N>78 according to FCC regulation in US), the duration of the superframe is the time during which the base station scans its hopping pattern, Fr is the set of frequencies that the remote station (mobile station) listens to during the radio environment listening, n is the number of frequencies in the Fr set.

Figure 5:
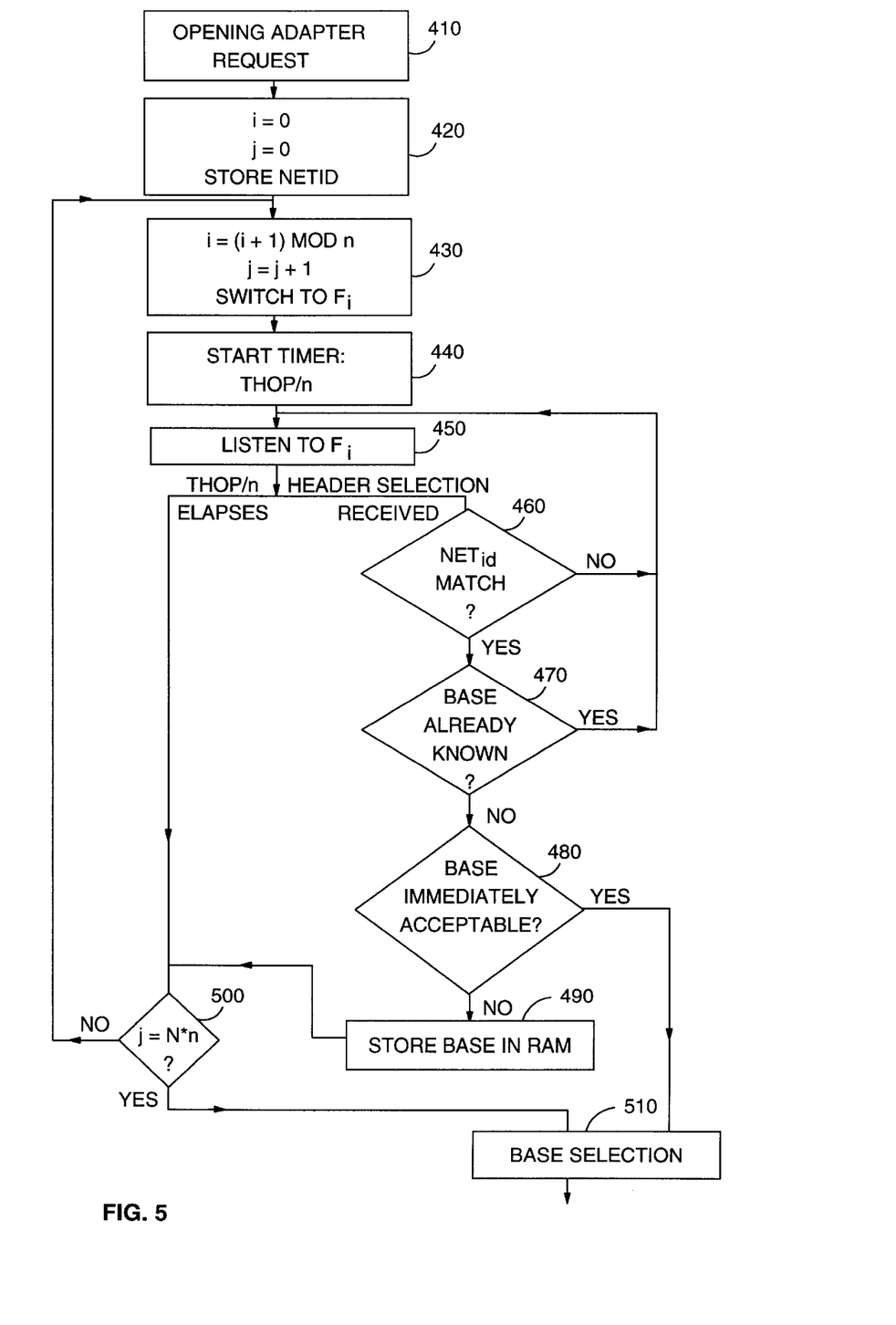
FIG. 5 is an illustration of a flow chart of steps employed in the monitoring and selection phases of the synchronization technique of the present invention.

Referring to FIG. 5, the initial pattern acquisition steps are shown. When a remote is first turned on, it does not know which are the surrounding bases and what frequency hopping patterns they have. However, it is assumed that it knows both the hop length and the superframe length. A remote depends on executing the algorithm shown in FIG. 5 in selecting its home base.

The flow diagram of the process is performed by the microprocessor system 56 of the transceiver adapter 44 of a registering mobile station 8 listening to its radio environment when it is first opened. It first receives, as depicted in function block, a transceiver adapter opening request from computer 50 via the computer bus interface 52. This opening request comprises a network identifier NETid of the logical network to register in. The microprocessor system 56 of registering mobile station 8 stores NETid in Data Storage 68 (step 420). It is assumed that registering mobile station 8 wants to register in a logical network comprising network cell 2 owned by base station 28 as depicted in FIG. 1. The mobile station 8 in step 420 sets two variables (i,j) to zero, wherein "i" is the index for the set of frequencies Fr used by the mobile station, while "j" is the number of frequency switches done by the mobile station. In function block 430, mobile station 8 switches to a frequency Fi, out of a set of "n" fixed operating frequencies, among predetermined frequencies selected according to U.S. Federal Communications Commission (FCC) in its regulations part 15.247. The index "i" and the variable "j" are incremented. In step 440, the mobile station 8 starts a timer during the listening duration of frequency Fi, and which is THOP/n. In next step 450, registering mobile station 8 listens to receive a packet in any type of time slots (FH,HH,SH,A,B,C), which is sent by any station (base or remote) in the cell. Upon receiving this packet, registering mobile station 8 waits for the occurrence of a header section (FH) and checks, that the network identifier NETid of the base station matches the network identifier NETid stored in Data Storage 68, as depicted in step 460. If it does not match, the registering mobile station 8 ignores this base station and keeps listening to the selected frequency Fi (step 450) until it receives another header section or until the end of the timer duration (THOP/n). If the network identifier NETid of the received header section corresponds to the NETid stored in Data Storage 68, registering mobile station 8 checks in step 470 if the base station address carried by the header section (FH) is an element of a list of owner base stations which are candidates identified during previous frequency iterations. If it is already recorded, it means that the same base station was previously found while listening to the registering mobile station radio environment, therefore the process loops back to step 450 and registering mobile station 8 keeps listening to the same frequency Fi until it receives another header section or until the end of the timer duration. If the base station identifier was not previously found, function block 480 is performed. Registering mobile station 8 checks if the strength of the signal received (RSSI) from the base station is greater than a given threshold, and checks if the number of mobile stations connected to this base station is not too high (compared to a given Load factor LF) in order not to overload the cell. If these two criteria are met (branch YES), the operation of the base selection of step 510 consists in selecting this last base station as the home station. If the result of the test is NO (one of the two or both criteria not met) then, on step 490, the base address, the strength of the received signal and the number of the mobile stations connected are stored in a Data Storage 68. On next step 500, the value of "j" is checked. If it is equal to "n×N", which means that the duration of the entire process has exceeded the length of the superframe, then the base selection process 510 is performed. If "j" is not equal to "n×N", then the process loops back to step 450, and mobile station 8 keeps listening to the same frequency Fi until it receives another header section or until the end of the timer duration. The efficiency of this method is directly related to the value of parameter "n". In fact, for a high value of "n", i.e. many frequencies selected for the set Fr of frequencies, the mobile station is scanning these frequencies in a short period of time which is THOP/n, and therefore the probability to hear a base station is increased. But there is a top limitation for the value of "n" which is linked to the minimum density of information transmitted or received by the base. For instance, in the preferred embodiment of the invention, the minimum density of information is one information every six slots, as showed in FIG. 3 on Time Frame 1. Succession of several time frames of the type Time Frame 1 in FIG. 3 represents the minimum density of information on a longer period. In this case, the succession of time slots is the following: SH CC CC SH CC CC SH CC CC . . . etc. SH is 2 time slots long and comprises one information (the SH packet) and all the CC maybe empty if the remote stations attached to the cell do not need to communicate with the base stations. Therefore the mobile station must stay six slots on the same frequency to hear an information coming from any station in the cell. In this case, with 48 slots in a FH period, the parameter "n" is then equal to 8 frequencies.

In another embodiment, in order to prevent mutual interferences between cells, the choice of the hopping pattern of the base station is not done randomly, but follows a general formula known to a skilled person in the art, and which is:

First base frequency F(1)=1

Th. base frequency F(i)=F(i−1)+C mod<N>, wherein C is a prime number greater or equal to seven, and wherein N is the length of the hopping pattern.

For the clarity of the description, the following example will illustrate the case with C=7 and N=79:

F(1)=2401 MHz

F(2)=2408 MHz

F(3)=2415 MHz, etc. . . .

In this environment, the choice of the "n" frequencies that the remote station listens to, is tuned to achieve a better radio environment listening. In that way, some sets Fr leading to degraded radio environment listening, are prohibited such as a set of "n" consecutive frequencies. One advantage of this embodiment is to avoid the choice of a potentially polluted frequency such as microwave oven frequency.

What we claim is:

1. A method for network attachment of a remote station to a base station in a multicellular communications network having base stations and a plurality of remote stations, wherein said base and remote stations emitting frames of information using a sequence of changing frequency hops of different operating frequencies, said method comprising at the remote station the steps of:

a) determining a set of "n" operating frequencies (Fi), b) listening sequentially on each of said operating frequencies (Fi) for frames of information emitted by base or remote stations, said listening being for a fixed period of time equal to 1/n of the frequency hopping period (FH) of a base station, c) collecting and processing the information contained in a frame when a frame of information is received during one of the fixed period, and d) selecting a base station for attachment.

2. The method according to claim 1, wherein a network identifier is assigned to each remote station, and wherein the frames of information include at least indicators of the network identifier (NETid) and the network load factor (LF).

3. The method according to claim 2, wherein the selecting step includes the steps of:

comparing the network identifier (NETid) contained in the frame of information received on step c) with the assigned network identifier of the receiving remote station, where upon comparison of the network identifiers:

if a match is detected, collecting the load factor (LF) indicator and a signal strength indication (RSSI), if a match is not detected, returning to the listening step b), selecting a base station in accordance with said indicators criteria.

4. The method according to claim 3, wherein, when said criteria are not met, the method further comprises the step of recording said indicators and returning to said listening step.

5. The method according to claim 4 wherein the listening step is repeated:

until a base station is selected according to the selecting step, or until the end of a timeout period equal to the length of the sequence of changing frequency hops.

6. The method according to claim 5 further comprising a step of selecting a base station using the recorded indicators if any, when the timeout period occurs.

7. In a communication system having base stations and a plurality of remote stations, wherein said base and remote stations emitting frames of information using a sequence of changing frequency hops of different operating frequencies, at least one of said remote stations comprising:

means for determining a set of "n" operating frequencies (Fi), means for listening sequentially on each of said operating frequencies (Fi) for frames of information emitted on said operating frequencies (Fi), wherein the listening is for a fixed period of time equal to 1/n of the frequency hopping period (FH), means for collecting and processing the information contained in a frame when a frame of information is received during one of the fixed periods of time; and means for selecting a base station for attachment.

8. The remote station according to claim 7, wherein a frame contains at least indicators of a network identifier (NETid) and a network load factor (LF).

9. The remote station according to claim 8, wherein the selecting means further comprises:

a means for comparing the network identifier (NETid) contained in the frame of information received by the collecting means, with an assigned network identifier of the remote station, where upon comparison if a match is detected, collecting the load factor (LF) indicator and a signal strength indication (RSSI) and selecting a base station in accordance with one or more indicator criteria.

10. The remote station according to claim 9, further comprising:

a recording means for recording said indicators when said criteria are not met.

11. The remote station according to claim 10 wherein the listening means continues to listen for frames until a base station is selected by the selection means or until the end of a timeout period equal to at least the length of the sequence of changing frequency hops.

12. The remote station according to claim 11 wherein the selection means selects a base station using the recorded indicators if any, when the timeout period occurs.

13. The method according to claim 1, wherein the set of "n" operating frequencies (Fi) relates to the remote station and the set is linked to a minimum density of information transmitted or received by the base station.

14. The method according to claim 1, wherein the step of listening further comprises the step of:

increasing a probability to hear the operating frequencies (Fi).

15. The remote station according to claim 7, wherein said set of "n" operating frequencies (Fi) relates to the remote station and the set is linked to a minimum density of information transmitted or received by the base station.

16. The method according to claim 7, wherein said means for listening sequentially on each of said operating frequencies (Fi) increases a probability to hear said operating frequencies (Fi).

* * * * *